(12) United States Patent
Zhang et al.

(10) Patent No.: US 11,336,631 B2
(45) Date of Patent: May 17, 2022

(54) AUTHORIZATION METHOD

(71) Applicant: HUAWEI TECHNOLOGIES CO., LTD., Shenzhen (CN)

(72) Inventors: Shengquan Zhang, Xi'an (CN); Kaiquan Chen, Xi'an (CN); Aihua Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 16/695,654

(22) Filed: Nov. 26, 2019

(65) Prior Publication Data

US 2020/0099673 A1     Mar. 26, 2020

Related U.S. Application Data

(63) Continuation of application No. PCT/CN2018/083585, filed on Apr. 18, 2018.

(30) Foreign Application Priority Data

May 27, 2017  (CN) .......................... 201710405789.2

(51) Int. Cl.
*H04L 29/06* (2006.01)
*H04L 9/08* (2006.01)
*H04L 9/32* (2006.01)

(52) U.S. Cl.
CPC ............ *H04L 63/08* (2013.01); *H04L 9/0866* (2013.01); *H04L 9/3247* (2013.01); *H04L 63/10* (2013.01)

(58) Field of Classification Search
CPC ......... H04L 63/08; H04L 9/08; H04L 9/0866; H04L 9/3247; H04L 63/10

USPC ........................................................... 726/4
See application file for complete search history.

(56) References Cited

U.S. PATENT DOCUMENTS

| | | | |
|---|---|---|---|
| 9,894,058 B2* | 2/2018 | Leow | H04L 67/22 |
| 10,142,320 B2* | 11/2018 | Coxe | G06F 21/31 |
| 10,637,855 B2* | 4/2020 | Mikulski | H04L 9/3297 |
| 2006/0080352 A1* | 4/2006 | Boubez | H04L 69/329 |

(Continued)

FOREIGN PATENT DOCUMENTS

| | | |
|---|---|---|
| CN | 101005357 A | 7/2007 |
| CN | 101409621 A | 4/2009 |

(Continued)

OTHER PUBLICATIONS

Office Action dated Apr. 21, 2020 from corresponding application No. CN 201710405789.2.

(Continued)

*Primary Examiner* — Dant B Shaifer Harriman
(74) *Attorney, Agent, or Firm* — Hauptman Ham, LLP

(57) ABSTRACT

An authorization method by an application stored in a memory includes obtaining, by the application, a client identifier of a client that is generated by a user center; performing, based on the client identifier, permission verification on an authorization credential, in response to authorization information being received by the application, the authorization information includes the authorization credential, the authorization credential is sent by the user center to the client; and allowing access of the client to the application in response to the permission verification on the authorization credential succeeding.

15 Claims, 16 Drawing Sheets

(56) References Cited

U.S. PATENT DOCUMENTS

| | | | |
|---|---|---|---|
| 2006/0129816 A1 | 6/2006 | Hinton | |
| 2011/0264910 A1 | 10/2011 | Masuda | |
| 2011/0283106 A1* | 11/2011 | Cui | H04L 63/08 713/168 |
| 2011/0296504 A1 | 12/2011 | Burch et al. | |
| 2012/0066753 A1* | 3/2012 | Pan | H04L 63/08 726/7 |
| 2012/0179587 A1* | 7/2012 | Hill | G06Q 30/04 705/34 |
| 2012/0331088 A1 | 12/2012 | O'Hare et al. | |
| 2013/0326596 A1 | 12/2013 | Hohlfeld et al. | |
| 2014/0189808 A1* | 7/2014 | Mahaffey | H04W 12/069 726/4 |
| 2014/0230020 A1* | 8/2014 | Mogaki | H04L 9/3213 726/4 |
| 2017/0302655 A1 | 10/2017 | Sondhi et al. | |
| 2019/0303600 A1* | 10/2019 | Hamel | H04L 63/0823 |
| 2020/0204534 A1* | 6/2020 | Beecham | H04L 63/083 |

FOREIGN PATENT DOCUMENTS

| | | |
|---|---|---|
| CN | 101645900 A | 2/2010 |
| CN | 101931533 A | 12/2010 |
| CN | 102231746 A | 11/2011 |
| CN | 103095457 A | 5/2013 |
| CN | 103428700 A | 12/2013 |
| CN | 103685282 A | 3/2014 |
| CN | 104486364 A | 4/2015 |
| CN | 104618738 A | 5/2015 |
| CN | 105335637 A | 2/2016 |
| CN | 105357197 A | 2/2016 |
| CN | 105659558 A | 6/2016 |
| CN | 106453378 A | 2/2017 |
| EP | 2400689 A1 | 12/2011 |

OTHER PUBLICATIONS

Chinese Third Office Action issued in corresponding Chinese Application No. 201710405789.2, dated Aug. 17, 2020, The State Intellectual Property Office of People's Republic of China, Beijing, China.

Notice of Allowance issued in corresponding Chinese Application No. 201710405789.2, dated Dec. 29, 2020, pp. 1-4.

Tayibia Bazaz et al: A Review on Single Sign on Enabling Technologies and Protocols, International Journal of Computer Applications, vol. 151, No. 11, Oct. 17, 2016 (Oct. 17, 2016), XP055668761, pp. 18-25.

\* cited by examiner

Client name: xxxx
Permission information: application 1 [role 1, role 2] and application 2 [role 1, role 2]
Authorization time: 2016/11/29 12:30:45
Deadline: 2016/11/30 12:30:45
Client identifier: w2wwwww2wwxx3xxxxxxyy3yyyyyyz14
Digital signature: wwwwwwwwxxxxxxxxyyyyyyyyzzzzzzzz

FIG. 3-2

AUTHORIZATION METHOD

CROSS-REFERENCE TO RELATED APPLICATIONS

This application is a continuation of International Application No. PCT/CN2018/083585, filed on Apr. 18, 2018, which claims priority to Chinese Patent Application No. 201710405789.2, filed on May 27, 2017, the disclosures of the aforementioned applications are hereby incorporated by reference in their entireties.

TECHNICAL FIELD

The present disclosure relates to the field of security technologies.

BACKGROUND

Authorization refers to verifying whether a client has permission to access an application. The application may be a program for providing a service function.

An authorization system of some approaches includes a user center, a plurality of clients, and a plurality of applications. When accessing a specific application, the client sends, to the application, a token (English: Token) provided by the user center. The application sends the token to the user center. The user center performs verification on the token, and when the verification on the token is successful, the user center instructs the application to allow the client access to the application.

However, when the user center performs verification on tokens of a relatively large quantity of applications, the verification speed performed by the user center on the tokens is reduced because of the limited processing capability of the user center, resulting in a reduced speed of authorizations.

SUMMARY

To resolve a prior-art problem that an authorization is relatively slow, embodiments of the present disclosure provide an authorization method, apparatus, and system, and a storage medium. The technical solutions are as follows:

According to at least one embodiment of the present disclosure, an authorization method is provided, and the method includes:

obtaining, by an entity device running an application, a client identifier of a client that is generated by an entity device running a user center, where the client identifier is an identifier allocated by the entity device running the user center after an entity device running the client logs in to the entity device running the user center, the application may be a program running on an entity device such as a terminal or a server, and the program is used to provide a service function; performing, by the entity device running the application by using the obtained client identifier, permission verification on an authorization credential when authorization information that includes the authorization credential and that is sent by the client is received, where the authorization credential is sent by the entity device running the user center to the entity device running the client, and is used together with the client identifier to prove a permission credential of the entity device running the client; and allowing, by the entity device running the application, access of the client to the entity device running the application when the permission verification on the authorization credential succeeds.

According to the authorization method provided in some embodiments, each application locally performs an authorization operation by using the client identifier thereby being a discrete authorization approach that is more flexible than other approaches.

In at least one embodiment, the performing, by the entity device running the application by using the client identifier, of permission verification on an authorization credential when authorization information that includes the authorization credential and that is sent by the entity device running the client is received includes:

performing, by the entity device running the application, validity verification on the authorization credential when the authorization information that includes the authorization credential and that is sent by the entity device running the client is received, where the validity verification is used to verify whether the authorization credential is generated by the entity device running the user center; performing, by the entity device running the application by using the client identifier, mutual identity verification with the entity device running the client when the validity verification on the authorization credential succeeds; and when the identity verification succeeds, determining, by the entity device running the application, that the permission verification succeeds.

According to the authorization method provided in some embodiments, the application performs the validity verification on the authorization credential to verify validity of the authorization credential, and performs the mutual identity verification with the client to ensure identity authenticity of the application and the client, so that permission verification security is relatively high.

In at least one embodiment, the authorization credential includes a digital signature (digital signature) generated by using a private key of the entity device running the user center.

The performing, by the entity device running the application, of validity verification on the authorization credential when the authorization information that includes the authorization credential and that is sent by the entity device running the client is received includes: when the authorization information that includes the authorization credential and that is sent by the entity device running the client is received, performing, by the entity device running the application, verification on the digital signature by using a public key of the entity device running the user center. When the verification succeeds, it indicates that the authorization credential is truly issued by the entity device running the user center, and the authorization credential is not modified. In this case, the entity device running the application may determine that the validity verification on the authorization credential succeeds. When the verification fails, it is determined that the validity verification on the authorization credential fails.

According to the authorization method provided in some embodiments, the digital signature may be used to verify whether the authorization credential is issued by the user center and whether the authorization credential is modified, so as to improve authorization method security.

In at least one embodiment, after the obtaining, by an entity device running an application, of the client identifier of the client from the entity device running the user center, the method further includes:

generating, by the entity device running the application, a verification key based on the client identifier by using a preset algorithm, where the preset algorithm may be pre-agreed between the entity device running the client and the entity device running the application; and the performing, by the entity device running the application, of mutual identity verification with the entity device running the client when the validity verification on the authorization credential succeeds includes:

proving, by the entity device running the application to the entity device running the client by using Challenge Handshake Authentication Protocol (Challenge Handshake Authentication Protocol, CHAP), that the verification key is consistent with a client key of the entity device running the client, where the client key is generated by the entity device running the user center based on the client identifier by using the preset algorithm; verifying, by the entity device running the application by using the CHAP, whether the client key is consistent with the verification key; and when the client key is consistent with the verification key, determining that the identity verification on the entity device running the client succeeds; or when the client key is inconsistent with the verification key, determining that the identity verification on the entity device running the client fails.

In at least one embodiment, Challenge Handshake Authentication Protocol (CHAP) is a protocol that can be used to verify whether two ends (for example, the entity device running the application and the entity device running the client) share one key. When the two ends share one key, CHAP indicates that identities of the two ends are authenticated. In such a method, no key is transmitted, and therefore security is relatively high.

In at least one embodiment, the authorization information further includes a first random character string. The first random character string may be randomly generated by the entity device running the client.

In at least one embodiment, the proving, by the entity device running the application to the entity device running the client by using CHAP, of that the verification key is consistent with a client key of the entity device running the client includes:

generating, by the entity device running the application, a second random character string; generating, by the entity device running the application, a first hashed message authentication code (e.g., Hash-based Message Authentication Code (HMAC)) by using a preset hash algorithm based on the verification key, the second random character string, the first random character string, and the client identifier; and sending, by the entity device running the application, the first HMAC and the second random character string to the entity device running the client, so that the client generates a second HMAC by using the preset hash algorithm based on the client key, the second random character string, the first random character string, and the client identifier, and when the second HMAC is consistent with the first HMAC, determines that the verification key is consistent with the client key of the entity device running the client.

In at least one embodiment, the verifying, by using the CHAP, whether the client key is consistent with the verification key includes:

receiving, by the entity device running the application, a third HMAC generated by the entity device running the client by using the preset hash algorithm based on the client key, the second random character string, the first random character string, and a name of a target entity device running the application, where the name of the target entity device running the application is a name of the entity device running the application that is to be accessed by the entity device running the client, and the entity device running the client is configured to send the third HMAC to the entity device running the application when determining that the verification key is consistent with the client key; generating, by the entity device running the application, a fourth HMAC by using the preset hash algorithm based on the verification key, the second random character string, the first random character string, and the name of the target entity device running the application; and when the fourth HMAC is consistent with the third HMAC, determining, by the entity device running the application, that the client key is consistent with the verification key; or when the fourth HMAC is inconsistent with the third HMAC, determining, by the entity device running the application, that the client key is inconsistent with the verification key.

In at least one embodiment, the authorization credential includes validity period information that records a validity period of the authorization credential.

In at least one embodiment, the performing, by the entity device running the application, of mutual identity verification with the entity device running the client when the validity verification on the authorization credential succeeds includes:

when the validity verification on the authorization credential succeeds, determining, by the entity device running the application based on the validity period information, whether the authorization credential falls within the validity period; and when the authorization credential falls within the validity period, performing, by the entity device running the application, the mutual identity verification with the entity device running the client. In some embodiments, the validity period is set by the entity device running the user center that issues the authorization credential. In some embodiments, after determining that the authorization credential is valid, the entity device running the application detects whether the authorization credential falls within the validity period, to avoid invalid identity verification.

In at least one embodiment, the authorization credential of the entity device running the application includes permission information of the entity device running the client, and the permission information records a service scope of the entity device running the client.

In at least one embodiment, the allowing, by the entity device running the application, access of the entity device running the client to the entity device running the application when the permission verification on the authorization credential succeeds includes:

providing, by the entity device running the application, the entity device running the client with a service in the service scope of the entity device running the client when the permission verification on the authorization credential succeeds. The entity device running the application may include a plurality of service scopes. The entity device running the application may provide the entity device running the client with a service in the service scope recorded in the permission information in the authorization credential.

In at least one embodiment, before the allowing access of the entity device running the client to the entity device running the application when the permission verification on the authorization credential succeeds, the method further includes:

obtaining, by the entity device running the application, at least one piece of role information, where each of the at least one piece of role information includes a role identifier and a service scope corresponding to the role identifier. The role information may be obtained by the entity device running the user center, or may be directly input by an administrator into the entity device running the application.

In at least one embodiment, the permission information includes at least one role identifier, and the providing the entity device running the client with a service in the service scope of the entity device running the client when the permission verification on the authorization credential succeeds includes:

when the permission verification on the authorization credential succeeds, determining, by the entity device running the application, a target service scope corresponding to the role identifier in the permission information; and providing, by the entity device running the application, the entity device running the client with a service in the target service scope. In some embodiments, the entity device running the application provides the entity device running the client with a service based on a service scope corresponding to obtained role information, so as to help the entity device running the application to manage permission of the entity device running the client that has different service scopes.

In at least one embodiment, the method further includes:

adjusting, by the entity device running the application, the at least one piece of role information, where the adjustment includes at least one of role information addition, role information deletion, and role information modification. In these embodiments, the entity device running the application may locally adjust the role information, to manage permission of the entity device running the client. The adjustment may be performed by the administrator or the entity device running the user center.

According to at least one embodiment of the present disclosure, an authorization method is provided, and the method includes:

obtaining, by an entity device running a client, authorization information that includes an authorization credential, the authorization information is generated by an entity device running a user center, where the authorization credential includes a client identifier; when accessing a target entity device running an application, sending, by the entity device running the client, authorization information that includes the authorization credential to the target entity device running the application; cooperating, by the entity device running the client, with the target entity device running the application to perform permission verification on the authorization credential; and accessing, by the entity device running the client, the target entity device running the application when the permission verification on the authorization credential succeeds, where the authorization credential is sent by the entity device running the user center to the entity device running the client, and the authorization credential is used together with the client identifier to prove a permission credential of the entity device running the client.

In at least one embodiment, the cooperating, by the entity device running the client, with the target entity device running the application to perform permission verification on the authorization credential includes:

performing, by the entity device running the client, mutual identity verification with the entity device running the application when validity verification performed by the entity device running the application on the authorization credential succeeds; and when the identity verification succeeds, determining, by the entity device running the client, that the permission verification on the authorization credential succeeds.

In at least one embodiment, the authorization information further includes a client key, and the client key is generated by the entity device running the user center based on the client identifier by using a preset algorithm; and the performing, by the entity device running the client, of mutual identity verification with the entity device running the application when validity verification on the authorization credential succeeds includes:

verifying, by the entity device running the client by using the CHAP, whether the client key is consistent with a verification key, where the verification key is generated by the target entity device running the application based on the client identifier by using the preset algorithm; when the client key is consistent with the verification key, determining, by the entity device running the client, that the identity verification on the entity device running the application succeeds. In some embodiments, the authorization information further includes a first random character string.

In at least one embodiment, the verifying, by the entity device running the client by using the CHAP, whether the client key is consistent with a verification key includes:

receiving, by the entity device running the client, a second random character string, and a first HMAC generated by the target entity device running the application by using a preset hash algorithm based on the verification key, the second random character string, the first random character string, and the client identifier; generating, by the entity device running the client, a second HMAC by using the preset hash algorithm based on the client key, the second random character string, the first random character string, and the client identifier; and when the first HMAC is consistent with the second HMAC, determining, by the entity device running the client, that the client key is consistent with the verification key; or when the first HMAC is inconsistent with the second HMAC, determining, by the entity device running the client, that the client key is inconsistent with the verification key.

In at least one embodiment, the proving, by the entity device running the client to the entity device running the application by using the CHAP, that the client key is consistent with the verification key includes:

when determining that the client key is consistent with the verification key, generating, by the entity device running the client, a third HMAC by using the preset hash algorithm based on the client key, the second random character string, the first random character string, and a name of the target entity device running the application; and sending, by the entity device running the client, the third HMAC to the target entity device running the application, so that the target entity device running the application generates a fourth HMAC by using the preset hash algorithm based on the verification key, the second random character string, the first random character string, and the name of the target entity device running the application, and when the fourth HMAC is consistent with the third HMAC, determines that the client key is consistent with the verification key.

According to at least one embodiment of the present disclosure, an authorization method is provided, and the method includes:

when an entity device running a client logs in, generating, by an entity device running a user center, a client identifier of the client; generating, by the entity device running the user center, a client key based on the client identifier by using a preset algorithm; obtaining, by the entity device running the user center, permission information of the client, where the permission information records at least one entity device running an application that can be accessed by the entity device running the client; generating, by the entity device running the user center, an authorization credential of the client based on the client identifier and the permission information; sending, by the entity device running the user center, authorization information that includes the authorization credential to the entity device running the client; and sending, by the entity device running the user center, the client identifier to the at least one entity device running the application, so that the at least one entity device running the application performs permission verification on the authorization credential by using the client identifier.

According to the authorization method provided in at least one embodiment of the present disclosure, the authorization credential and the key are issued to the client, and the client identifier used to perform the permission verification on the authorization credential is sent to the entity device running the application, so that the entity device running the application itself can perform authorization on the client thereby being a discrete authorization approach that is more flexible than other approaches. In at least one embodiment, before the sending, by the entity device running the user center, of the authorization credential to the entity device running the client, the method further includes:

setting, by the entity device running the user center, a digital signature on the authorization credential by using a private key in a local device, where the local device may be the user center or the entity device running the user center; and the sending, by the entity device running the user center, of the authorization credential to the entity device running the client includes:

sending, by the entity device running the user center to the entity device running the client, the authorization credential on which the digital signature is set.

According to at least one embodiment of the present disclosure, an authorization apparatus is provided. The authorization apparatus includes at least one module, and the at least one module is configured to implement the authorization method provided in at least one embodiment of the present disclosure.

According to at least one embodiment of the present disclosure, an authorization apparatus is provided. The authorization apparatus includes at least one module, and the at least one module is configured to implement the authorization method provided in at least one embodiment of the present disclosure.

According to at least one embodiment of the present disclosure, an authorization apparatus is provided. The authorization apparatus includes at least one module, and the at least one module is configured to implement the authorization method provided in at least one embodiment of the present disclosure.

According to at least one embodiment of the present disclosure, an authorization apparatus is provided. The authorization apparatus includes a processor, a network interface, a memory, and a bus. The memory and the network interface are separately connected to the processor by using the bus; the processor is configured to execute an instruction stored in the memory; and the processor executes the instruction to implement the authorization method provided in at least one embodiment of the present disclosure.

According to at least one embodiment of the present disclosure, an authorization apparatus is provided. The authorization apparatus includes a processor, a network interface, a memory, and a bus. In some embodiments, the memory and the network interface are separately connected to the processor by using the bus; the processor is configured to execute an instruction stored in the memory; and the processor executes the instruction to implement the authorization method provided in at least one embodiment of the present disclosure.

According to at least one embodiment of the present disclosure, an authorization apparatus is provided. The authorization apparatus includes a processor, a network interface, a memory, and a bus. In some embodiments, the memory and the network interface are separately connected to the processor by using the bus; the processor is configured to execute an instruction stored in the memory; and the processor executes the instruction to implement the authorization method provided in at least one embodiment of the present disclosure.

According to at least one embodiment of the present disclosure, an authorization system is provided. The authorization system includes an application, a client, and a user center.

In at least one embodiment, the application includes the authorization apparatus provided in at least one embodiment of the present disclosure.

In at least one embodiment, the client includes the authorization apparatus provided in at least one embodiment of the present disclosure.

In at least one embodiment, the user center includes the authorization apparatus provided in at least one embodiment of the present disclosure.

According to at least one embodiment of the present disclosure, a computer readable storage medium is provided. The computer readable storage medium stores an instruction, and when the instruction runs on an authorization apparatus, the authorization apparatus performs the authorization method provided in at least one embodiment of the present disclosure.

According to at least one embodiment of the present disclosure, a computer readable storage medium is provided. The computer readable storage medium stores an instruction, and when the instruction runs on an authorization apparatus, the authorization apparatus performs the authorization method provided in at least one embodiment of the present disclosure.

According to at least one embodiment of the present disclosure, a computer readable storage medium is provided. The computer readable storage medium stores an instruction, and when the instruction runs on an authorization apparatus, the authorization apparatus performs the authorization method provided in at least one embodiment of the present disclosure.

The technical solutions provided in the embodiments of the present disclosure bring the following beneficial effects:

In some embodiments, each application locally performs, by using a client identifier, an authorization operation on an authorization credential issued by a user center to a client thereby implementing discrete authorization, and the user center does not perform centralized authorization. Compared with centralized authorization in other approaches, an authorization speed is increased through discrete authorization.

BRIEF DESCRIPTION OF DRAWINGS

FIG. 3-1 is a flowchart of an authorization method according to at least one embodiment of the present disclosure;

FIG. 3-2 is a schematic structural diagram of an authorization credential according to at least the embodiment shown in FIG. 3-1;

FIG. 4-2 is a flowchart of performing validity verification according to at least the embodiment shown in FIG. 4-1A and FIG. 4-1B;

FIG. 4-3 is a flowchart of verifying whether a client key is consistent with a verification key according to at least the embodiment shown in FIG. 4-1A and FIG. 4-1B;

FIG. 4-4 is another flowchart of verifying whether a client key is consistent with a verification key according to at least the embodiment shown in FIG. 4-1A and FIG. 4-1B;

FIG. 5-1 is a structural block diagram of another authorization apparatus according to at least one embodiment of the present disclosure;

FIG. 5-2 is a structural block diagram of a permission verification module according to at least the authorization apparatus shown in FIG. 5-1;

FIG. 5-3 is a structural block diagram of another authorization apparatus according to at least one embodiment of the present disclosure;

FIG. 5-4 is a structural block diagram of an application identity verification submodule according to at least the authorization apparatus shown in FIG. 5-1;

FIG. 5-5 is a structural block diagram of an access success module according to at least the authorization apparatus shown in FIG. 5-1;

FIG. 5-6 is a structural block diagram of another authorization apparatus according to at least one embodiment of the present disclosure;

FIG. 5-7 is a structural block diagram of another authorization apparatus according to at least one embodiment of the present disclosure;

FIG. 6-1 is a structural block diagram of an authorization apparatus according to at least one embodiment of the present disclosure;

FIG. 6-2 is a structural block diagram of an information sending module according to at least the apparatus shown in FIG. 6-1;

FIG. 6-3 is a structural block diagram of an identity verification submodule according to at least the apparatus shown in FIG. 6-1;

FIG. 7-1 is a structural block diagram of an authorization apparatus according to at least one embodiment of the present disclosure;

FIG. 7-2 is a structural block diagram of another authorization apparatus according to at least one embodiment of the present disclosure.

DETAILED DESCRIPTION

Hereinafter, at least one embodiment of the present disclosure will be described in detail with reference to the accompanying drawings. However, it is understood that the following description is not limiting, and specific objectives, technical solutions, and/or advantages may be described below to simplify the present disclosure, and are not limiting.

Figure 1:
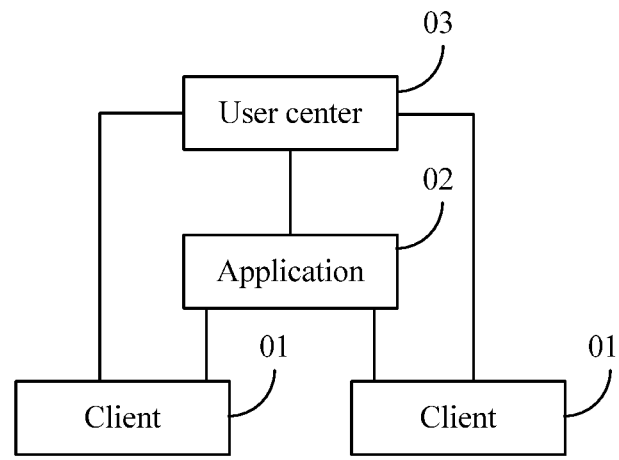
FIG. 1 is a schematic diagram of an implementation environment in at least one embodiment of the present disclosure.

FIG. 1 is a schematic diagram of an implementation environment in at least one embodiment of the present disclosure. The implementation environment may include a client 01, an application 02, and a user center 03. The client 01 may separately establish a connection to the application 02 and the user center 03, and the application 02 may establish a connection to the user center 03. There may be at least one client 01 and at least one application 02, and there may be one user center 03. The client 01, the application 02, and the user center 03 each may be a program that runs on an entity device such as a terminal or a server. In some embodiments, the terminal may include a mobile phone, a tablet computer, a computer, a portable computer, a digital camera, an intelligent wearable device, or the like. A plurality of clients 01 may run in a plurality of entity devices. A plurality of applications 02 may run in one entity device, or may run in a plurality of entity devices. The plurality of applications 02 and the user center 03 may run in one entity device.

In this implementation environment, the client 01 is a program used by a user to access the application 02, the application 02 is a program used to provide various functions for the client 01, and the user center 03 is a program used to authorize the client 01. For example, the client 01 may be a program running in a mobile terminal of the user, the application 02 is a program that runs in a server and that is used to provide a video viewing service, and the user center 03 is a program that runs in a server and that is used to authorize the client 01. In some embodiments, the user center 03 and the application 02 may run in a same server, or may run in different servers. The user center 03 may grant common permission or very important person (VIP) permission to the client 01, and the application 02 may provide different services for the client based on permission of the client 01, for example, provide a video playback service including an advertisement for a client having common permission, and provide a video playback service excluding an advertisement for a client having VIP permission.

Figure 2:
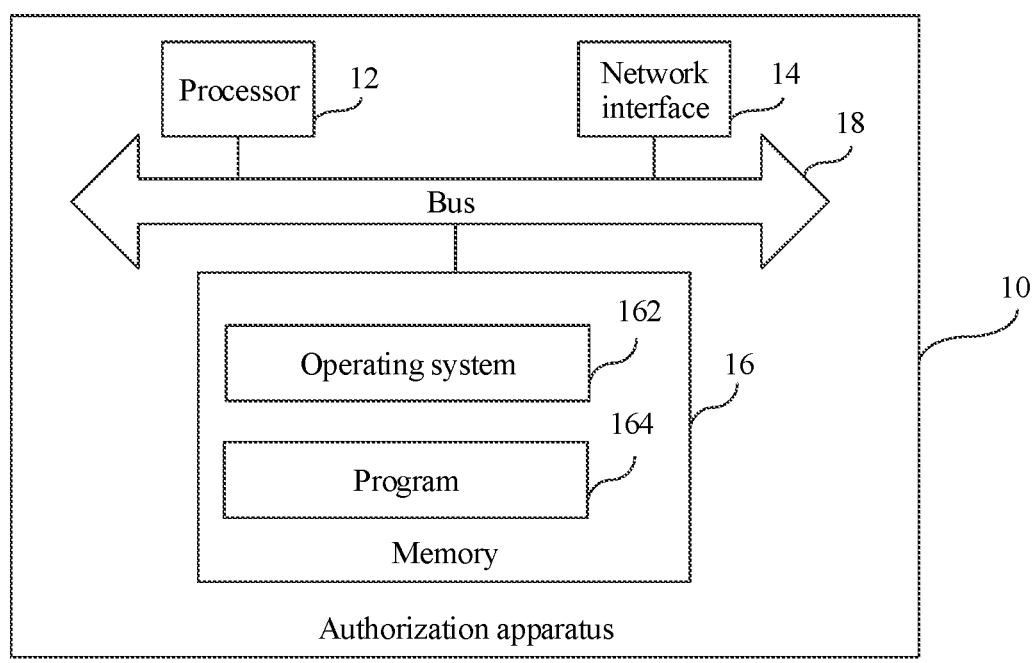
FIG. 2 is a schematic structural diagram of an authorization apparatus according to at least one example embodiment of the present disclosure.

FIG. 2 is a schematic structural diagram of an authorization apparatus 10 according to an example embodiment of the present disclosure. The authorization apparatus 10 may be configured to run the client 01, the application 02, or the user center 03 described above. The authorization apparatus 10 includes a processor 12 and a network interface 14.

The processor 12 includes one or more processing cores. The processor 12 performs various function applications and data processing by running a software program and a module.

In some embodiments, the authorization apparatus 10 further includes a plurality of network interfaces 14. The network interface 14 is configured to communicate with another storage device or network device.

In some embodiments, the authorization apparatus 10 further includes components such as a memory 16 and a bus 18. In some embodiments, the memory 16 and the network interface 14 are separately connected to the processor 12 by using the bus 18.

The memory 16 may be configured to store a software program and a module. Specifically, the memory 16 may store an operating system 162, and a program 164 by at least one function. The operating system 162 may be a real-time operating system (e.g., Real-Time Executive or RTX), a Linux operating system (Linux), a UNIX operating system (UNIX), or a Windows operating system (Windows). When running the program 164, the authorization apparatus 10 may perform an authorization method described in the following embodiments.

In some embodiments of the present disclosure, two parts, namely, credential issue and authorization may be included, and the two parts will be described herein separately.

Figures 1, 3:
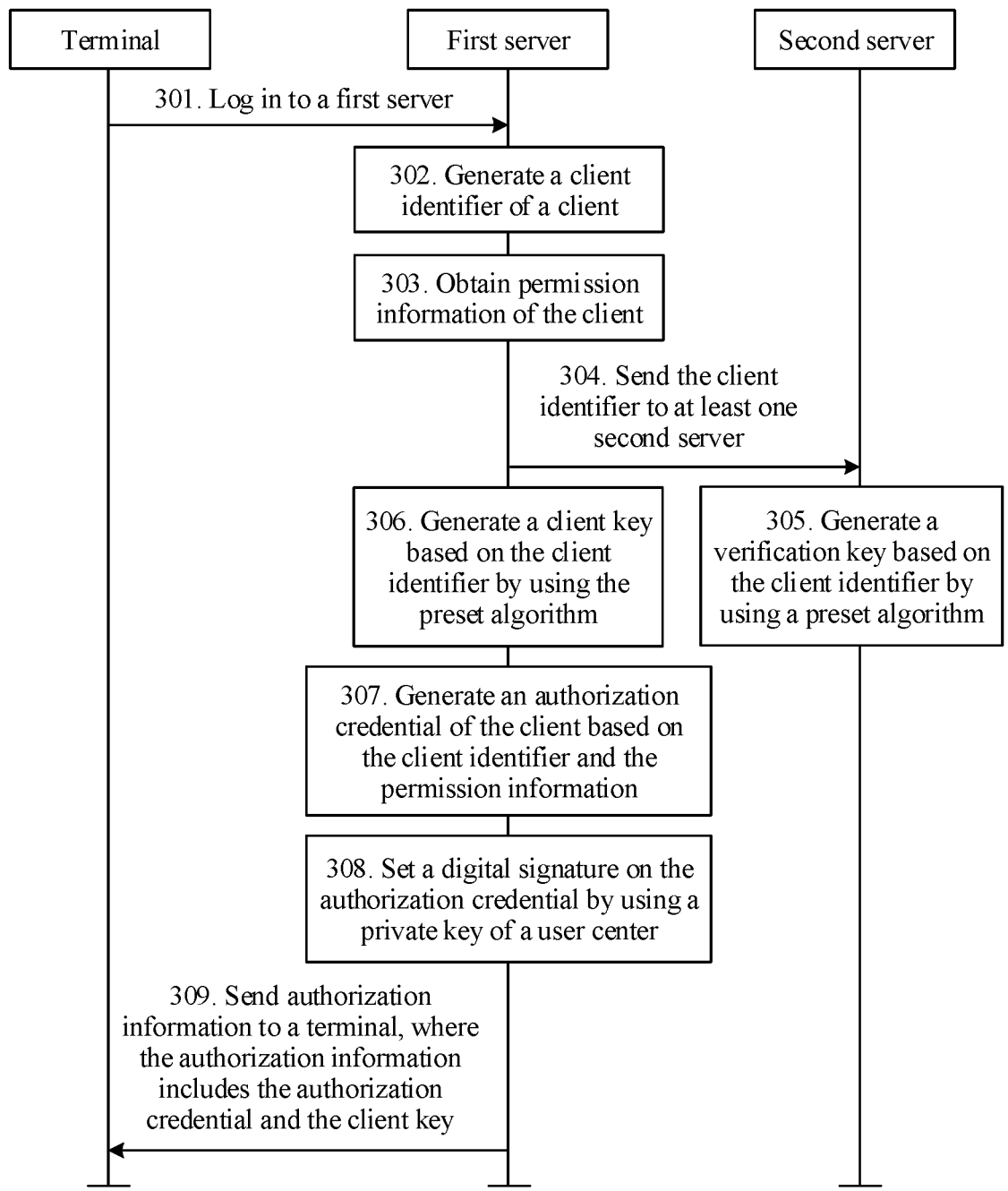

Credential Issue:

FIG. 3-1 is a flowchart of an authorization method according to an embodiment of the present disclosure. In some embodiments, the authorization method includes one or more of the following steps.

Step 301: A terminal logs in to a first server.

The terminal running a client may log in to the first server running a user center by a user name and a password. For example, when a user watches a video by a video playback client in a mobile terminal, the user may first operate the video playback client in the mobile terminal to log in to the first server running the user center in a video playback platform. In some embodiments, the video playback platform may include the first server running the user center and a second server running a plurality of applications.

The user name and the password of the client may be obtained through registration with the user center before step 301.

In this embodiment of the present disclosure, the terminal may be a terminal running a client, the first server may be a server running a user center, the client may be the client 01 in FIG. 1, and the user center may be the user center 03 in FIG. 1.

In this embodiment of the present disclosure, a client runs in a terminal, and a user center and an application run in a server is used for description as an example. However, the client may alternatively run in another entity device such as the server, and the user center or the application may alternatively run in another entity device such as the terminal. This is not limited in this embodiment of the present disclosure. For example, in this embodiment of the present disclosure, when the client runs in another entity device, the terminal may be replaced with the another entity device.

Step 302: The first server generates a client identifier of a client.

The user center may generate a client identifier for each login client to serve as an identity of the client. The user center generates different client identifiers for different clients. The user center may distinguish between the clients by user names or other information provided after the clients log in.

Step 303: The first server obtains permission information of the client.

The permission information may be directly input by an administrator of the user center into the user center or the user center directly locally obtains the permission information corresponding to the client. The permission information may record at least one application that can be accessed by the client.

A process in which the first server obtains the permission information of the client is a process of authorizing the client.

Step 304: The first server sends the client identifier to at least one second server.

The first server may send the client identifier of the client to the at least one second server running an application that can be accessed by the client.

The first server and the second server may be a same server, or may be different servers.

Each of the at least one second server running the application may run at least one application.

For example, the user center in the video playback platform may send the client identifier to the at least one application that can be accessed by the client.

Step 305: The at least one second server generates a verification key based on the client identifier by using a preset algorithm.

The preset algorithm may be notified by the first server to each application in advance, or the preset algorithm may be locally stored in an application when the application is obtained. After generating the verification key, the at least one application may map verification keys to client identifiers in a one-to-one manner, and locally store the verification keys and the client identifiers.

Step 306: The first server generates a client key based on the client identifier by using the preset algorithm.

In some embodiments, step 306 may be performed together with step 305, may be performed before step 305 and after step 302, or may be performed after step 305 and before step 309. However, other variations exist in the present disclosure that are not limited to this embodiment.

In some embodiments, after step 305 and step 306, the at least one application and the client have keys that are generated based on the client identifier by using a same algorithm. In these embodiments, the at least one application and the client share one key, and the at least one application and the client may perform mutual identity verification by using the shared key.

Step 307: The first server generates an authorization credential of the client based on the client identifier and the permission information.

The user center may add the client identifier and the permission information to a file (for example, a text file), and the file may be used as the authorization credential of the client. The authorization credential may further include a validity period, and the validity period indicates the validity period of the authorization credential. When a moment at which the application performs verification on the authorization credential does not fall within the validity period, the authorization credential is invalid. In some embodiments, "not fall within the validity period" may include "not reach the validity period" or "out of the validity period". An upper limit of the validity period may be set by the administrator of the user center. For example, the upper limit of the validity period of the authorization credential may be 30 days. Other values for the upper limit of the validity period are within the scope of the present disclosure. The client may select a validity period less than or equal to the upper limit. In some embodiments, security in authorization can be improved by setting the validity period of the authorization credential.

Step 308: The first server sets a digital signature on the authorization credential by using a private key of the user center.

The user center may have a private key (Private Key) and a public key (Public Key) corresponding to the private key. The private key is locally stored in the user center and is confidential, and the public key is public (for example, is stored in a public server) and may be obtained by any user. In some embodiments, data encrypted by using the private key can be decrypted only by using the public key.

The first server may generate a message digest (e.g., Message Digest ("MD")) of the authorization credential by using a hash algorithm, encrypt the message digest by using the local private key to obtain the digital signature, and set the digital signature on the authorization credential. The second server running the application may verify the digital signature by using the public key of the user center, to verify an identity of a generator of the authorization credential and integrity of the authorization credential.

In some embodiments, the public key and the private key are part of an asymmetric encryption technology.

Step 309: The first server sends authorization information to the terminal, where the authorization information includes the authorization credential and the client key.

The user center may send the authorization credential and the client key to the client through a secure channel, so as to ensure security of the authorization credential and the client key. For example, the user center may send the authorization credential and the client key to the client through a secure channel that is based on the Data Encryption Standard (DES).

According to the authorization method provided in at least one embodiment of the present disclosure, the user center sends the authorization credential to the client, and sends, to the application, the client identifier to perform verification on the authorization credential, so that the application can perform discrete authorization on the client. Compared with centralized authorization in other approaches, an authorization speed of the present disclosure is increased through discrete authorization.

FIG. 3-2 is a schematic structural diagram of an authorization credential on which a digital signature is set. The authorization credential may include a client name, the permission information, an authorization time, a deadline, the client identifier, and the digital signature. In some embodiments, the client name includes a user name used by the user to log in to the user center. In some embodiments, the deadline is the duration between the authorization time and the validity period of the authorization credential. The permission information may include a role identifier of the client in each application (for example, a role 1 and a role 2 in FIG. 3-2). Each role identifier may be corresponding to a service scope, and a correspondence between a role identifier and a service scope may not be included in the authorization credential. The application may provide the client with a service in the service scope. For example, the role identifier in the permission information may be a "common user", and a service scope corresponding to the "common user" may include a video playback service. In this case, the application may provide the video playback service for the client based on the service scope.

Figures 1A, 4:
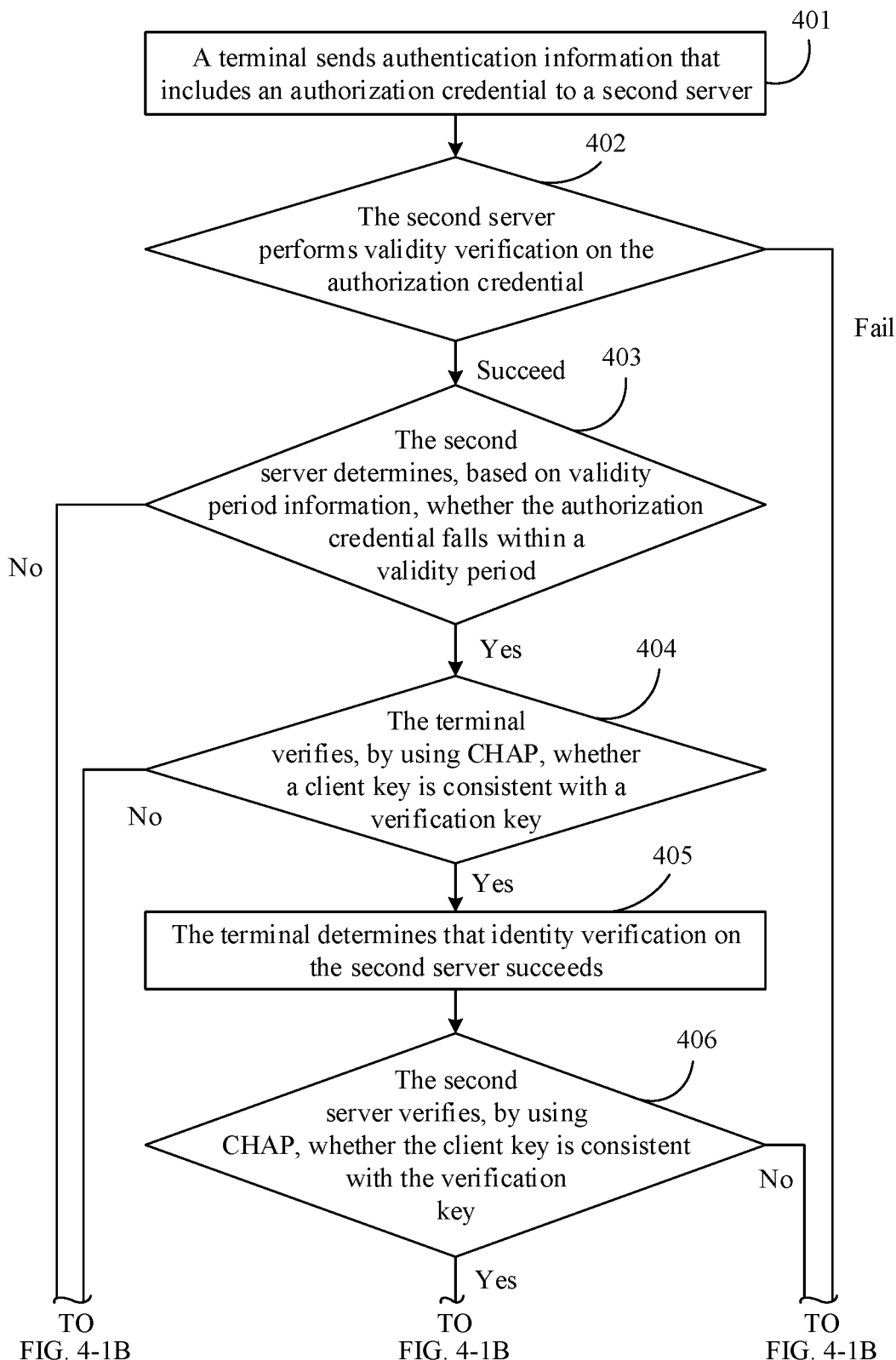
FIG. 4-1A and FIG. 4-1B are a flowchart of an authorization method according to at least one embodiment of the present disclosure.
Figures 1B, 4:
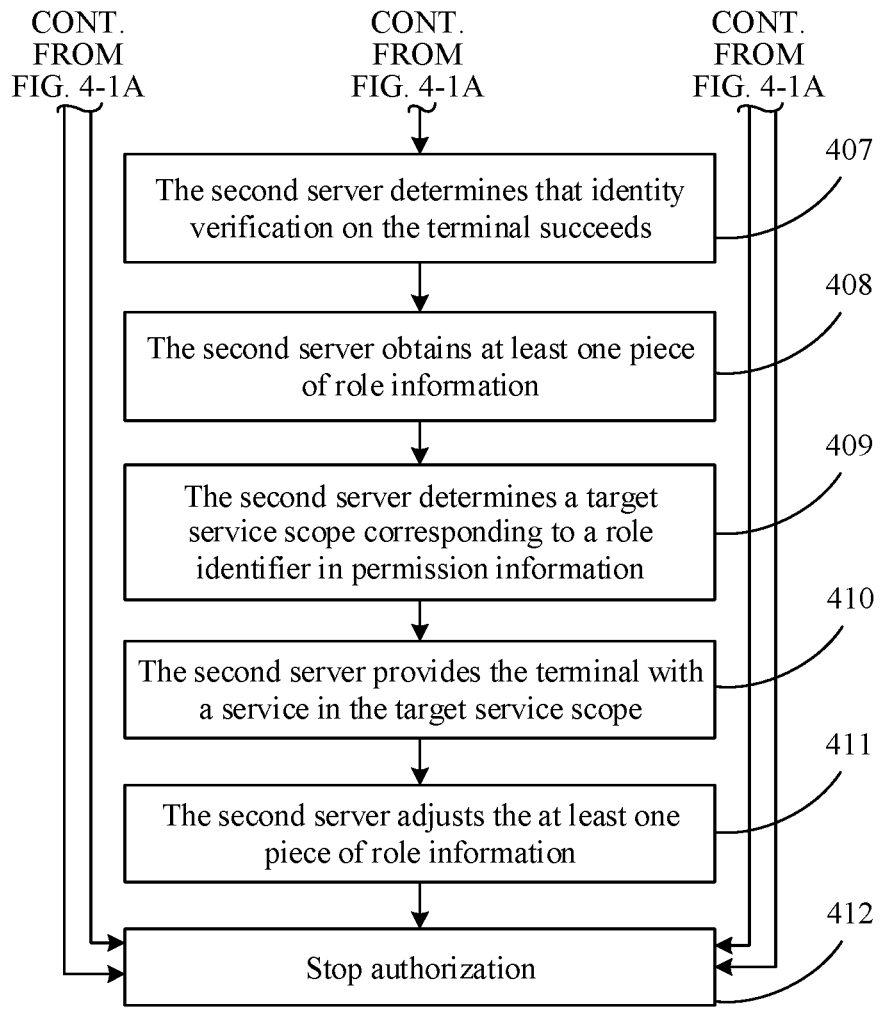
Figures 2, 4:
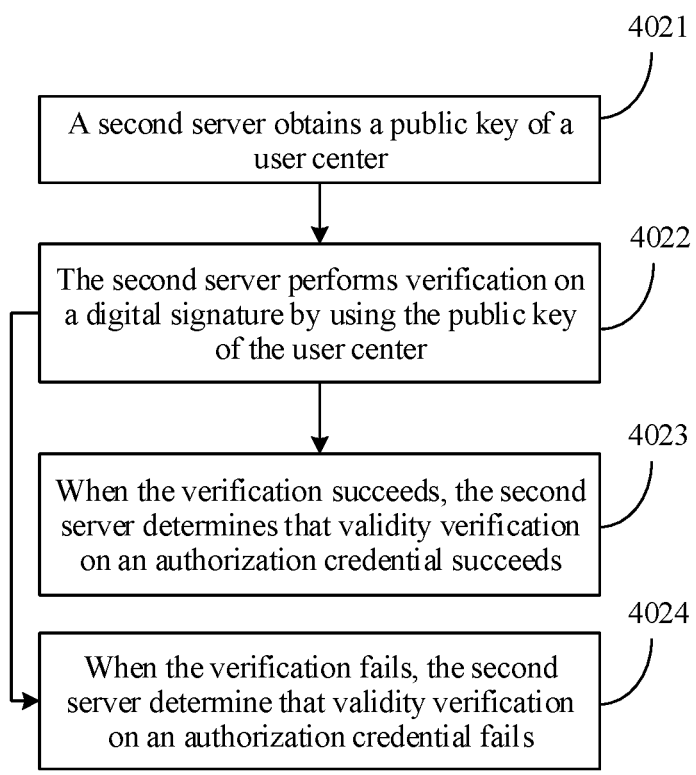
Figures 3, 4:
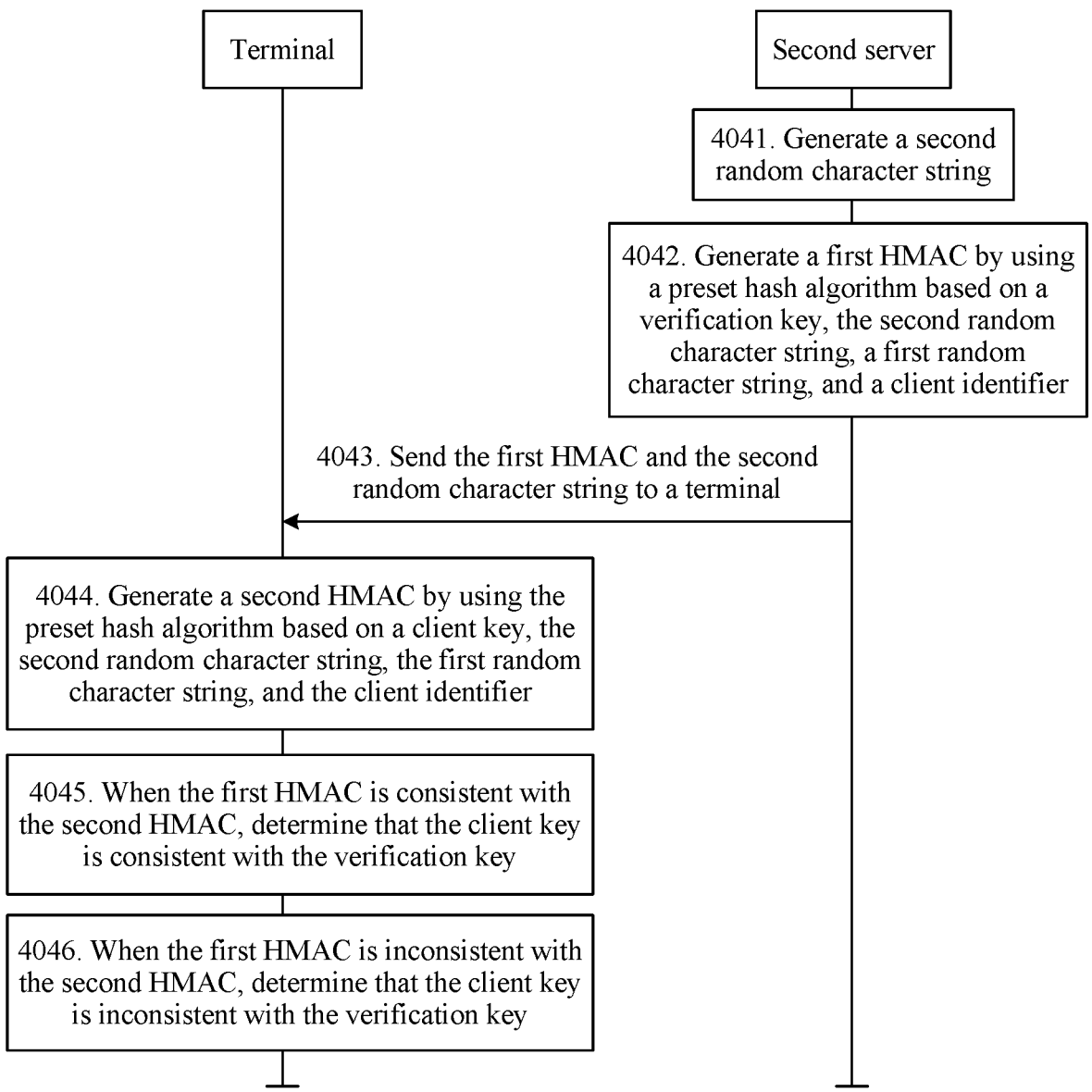
Figure 4:
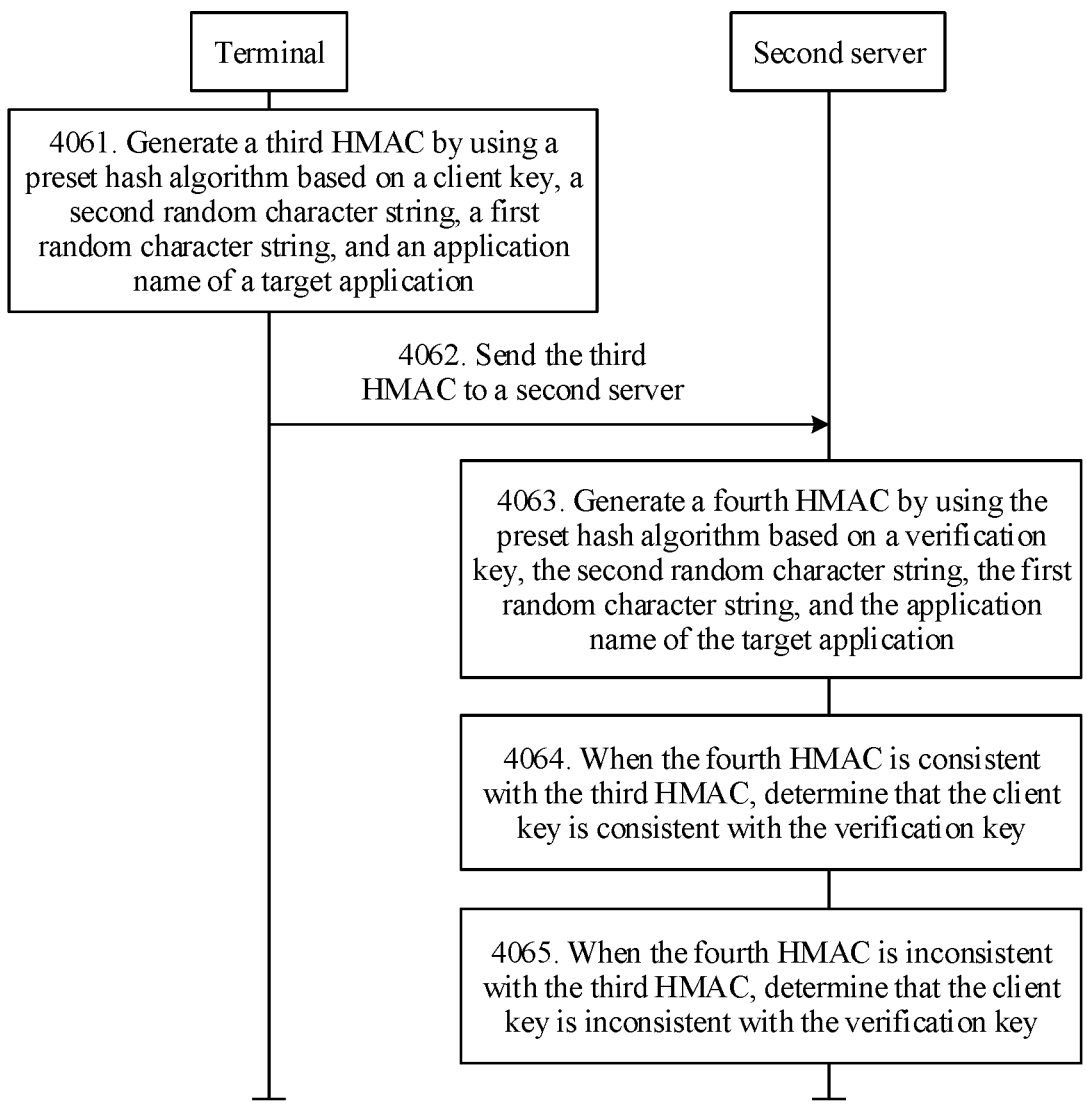

Authorization:

FIG. 4-1A and FIG. 4-1B are a flowchart of an authorization method according to an embodiment of the present disclosure. In some embodiments, the authorization method includes one or more of the following steps.

Step 401: A terminal sends authorization information that includes an authorization credential to a second server.

In some embodiments, the terminal is a terminal running a client, the second server is a server running a target application, and the target application is an application that the client needs to be access. The authorization information may include the authorization credential and a first random character string. The first random character string is randomly generated by the client.

For example, after operating a video playback client to successfully obtain an authorization credential and a client key that are issued by a user center in a video playback platform, a user may send authorization information to a video playback application (e.g., the target application) in the video playback platform, to attempt to obtain a video playback service provided by the video playback application.

In this embodiment of the present disclosure, an example in which a client runs in a terminal, and a user center and an application run in a server is used for description. However, the client may alternatively run in another entity device such as the server, and the user center or the application may alternatively run in another entity device such as the terminal. However, other variations are within the scope of the present disclosure, and are not limited to this embodiment. For example, in this embodiment of the present disclosure, when the client runs in another entity device, the terminal may be replaced with the another entity device.

Step 402: The second server performs validity verification on the authorization credential, and when the validity verification on the authorization credential succeeds, performs step 403, or when the validity verification on the authorization credential fails, performs step 412.

After receiving the authorization information sent by the client, the target application learns that the client needs to access the target application. In this case, the target application may perform the validity verification on the authorization credential.

FIG. 4-2 is a flowchart of performing validity verification according to at least the embodiment shown in FIG. 4-1A and FIG. 4-1B. In some embodiments, FIG. 4-2 is an embodiment of step 402. In some embodiments, as shown in FIG. 4-2, step 402 includes one or more of sub-steps 4021, 4022, 4023 or 4024.

Sub-step 4021: The second server obtains a public key of a user center.

The second server may obtain the public key by using a server of the user center that stores the public key of the user center. For example, the public key of the user center may be stored in a Certificate Authority (CA), and the second server may obtain the public key of the user center from the CA.

Sub-step 4022: The second server performs verification on a digital signature by using the public key of the user center, and when the verification succeeds, performs sub-step 4023, or when the verification fails, performs sub-step 4024.

A process of performing verification on the digital signature by using the public key may be as follows: 1. The target application decrypts the digital signature by using the public key, to obtain a message digest of the authorization credential. 2. The target application generates the message digest of the authorization credential by using a hash algorithm used when the user center generates the message digest. In some embodiments, the hash algorithm may be pre-agreed between the application and the user center. 3. The target application compares the locally generated message digest with the message digest obtained through decryption; and if the two message digests are consistent, which indicates that the verification on the digital signature succeeds, or if the two message digests are inconsistent, which indicates that the verification on the digital signature fails. In some embodiments, consistent can include the same. In some embodiments, inconsistent can include being different.

Sub-step 4023: When the verification succeeds, the second server determines that the validity verification on the authorization credential succeeds.

When the verification succeeds, which indicates that the authorization credential sent by the terminal is truly generated by the user center and is not modified, and the target application may determine that the validity verification on the authorization credential succeeds.

Sub-step 4024: When the verification fails, the second server determines that the validity verification on the authorization credential fails.

When the verification fails, which indicates that the authorization credential sent by the client is not generated by the user center or has been modified, and which indicates that the validity verification on the authorization credential fails.

Step 403: The second server determines, based on validity period information, whether the authorization credential falls within a validity period, and when the authorization credential falls within the validity period (e.g., "yes"), performs step 404, or when the authorization credential does not fall within the validity period (e.g., "no"), performs step 412.

The authorization credential may include the validity period information (for example, the authorization time and the deadline in FIG. 3-2), and the digital signature may ensure that the validity period information is not modified.

When a current moment falls within the validity period, the second server may determine that the authorization credential falls within the validity period, and performs mutual identity verification with the terminal. When the current moment does not fall within the validity period, the second server may determine that the authorization credential does not fall within the validity period.

In addition, the second server may maintain locally stored client identifiers, verification keys, and authorization credentials based on validity periods, and during maintenance, may delete a client identifier, a verification key (validity periods of the client identifier and the verification key depend on corresponding authorization credentials), and an authorization credential that exceed validity periods.

In some embodiments, t steps 404 to 406 are steps of performing mutual identity verification between the target application and the client.

Step 404: The terminal verifies, by using the CHAP, whether a client key is consistent with a verification key, and when the client key is consistent with the verification key, performs step 405, or when the client key is inconsistent with the verification key, performs step 412.

In this embodiment of the present disclosure, the terminal running the client may first perform identity verification on the second server running the target application, and an authentication manner may be: verifying, by using CHAP, whether the target application has the verification key that is consistent with the client key of the client.

The CHAP is a protocol used to perform identity verification.

FIG. 4-3 is a flowchart of verifying whether a client key is consistent with a verification key according to at least the embodiment shown in FIG. 4-1A and FIG. 4-1B. In some embodiments, FIG. 4-3 is an embodiment of step 404. In some embodiments, as shown in FIG. 4-3, step 404 includes one or more of sub-steps 4041, 4042, 4043, 4044, 4045 or 4046.

Sub-step 4041: The second server generates a second random character string.

Sub-step 4042: The second server generates a first HMAC by using a preset hash algorithm based on a verification key, the second random character string, a first random character string, and a client identifier.

Because the first random character string and the second random character string are regenerated each time identity verification is performed, the second server is unlikely to reuse the first HMAC, and therefore security is relatively high. In addition, identity verification reliability can be further improved by generating the first HMAC based on the client identifier.

Sub-step 4043: The second server sends the first HMAC and the second random character string to a terminal.

Sub-step 4044: The terminal generates a second HMAC by using the preset hash algorithm based on the client key, the second random character string, the first random character string, and the client identifier.

The preset hash algorithm may be prestored in the client, or may be sent by the user center to the terminal.

Sub-step 4045: When the first HMAC is consistent with the second HMAC, the terminal determines that the client key is consistent with the verification key.

Except the key, other parameters (e.g., the second random character string, the first random character string, and the client identifier) used when the terminal running the client and the target application calculate the HMAC are all consistent. Therefore, when the first HMAC is consistent with the second HMAC, the terminal running the client may determine that the client key is consistent with the verification key.

Sub-step 4046: When the first HMAC is inconsistent with the second HMAC, the terminal determines that the client key is inconsistent with the verification key.

When the client key is inconsistent with the verification key, step 412 of stopping authorization may be performed.

Step 405: The terminal determines that identity verification on the second server succeeds, and performs step 406.

When the client key is consistent with the verification key, the terminal running the client may determine that the identity verification on the second server running the target application succeeds. The client performs the identity verification on the target application, so that the client can be prevented from accessing a false application provided by a phishing website.

After step 405, the target application may perform identity verification on the client.

Step 406: The second server verifies, by using CHAP, whether the client key is consistent with the verification key, when the client key is consistent with the verification key, performs step 407, or when the client key is inconsistent with the verification key, performs step 412.

FIG. 4-4 is another flowchart of verifying whether a client key is consistent with a verification key according to at least the embodiment shown in FIG. 4-1A and FIG. 4-1B. In some embodiments, FIG. 4-4 is an embodiment of step 406. In some embodiments, as shown in FIG. 4-4, step 404 includes one or more of sub-steps 4061, 4062, 4063, 4064 or 4065.

Sub-step 4061: The terminal generates a third HMAC by using the preset hash algorithm based on the client key, the second random character string, the first random character string, and an application name of a target application.

Sub-step 4062: The terminal sends the third HMAC to the second server.

Sub-step 4063: The second server generates a fourth HMAC by using the preset hash algorithm based on the verification key, the second random character string, the first random character string, and the application name of the target application.

Sub-step 4064: When the fourth HMAC is consistent with the third HMAC, the second server determines that the client key is consistent with the verification key.

Sub-step 4065: When the fourth HMAC is inconsistent with the third HMAC, the second server determines that the client key is inconsistent with the verification key.

When the client key is inconsistent with the verification key, step 412 of stopping authorization may be performed.

For step 406, refer to the process in step 404 in which the terminal running the client performs the identity verification on the second server running the target application.

In addition, in this embodiment of the present disclosure, the target application may first perform the identity verification on the client, and then the client performs the identity verification on the target application. However, other variations are within the scope of the present disclosure, and are not limited to this embodiment.

Step 407: The second server determines that identity verification on the terminal succeeds, and performs step 408.

When the client key is consistent with the verification key, the target application may determine that the identity verification on the client succeeds. The target application performs the identity verification on the client, so that theft of the authorization credential can be avoided.

After the target application determines that the identity verification on the client succeeds, which indicates that permission verification performed by the target application on the authorization credential succeeds.

Step 408: The second server obtains at least one piece of role information, and performs step 409.

In some embodiments, each of the at least one piece of role information includes a role identifier and a service scope corresponding to the role identifier. The role information is information used for permission management. The role identifier in each piece of role information may be corresponding to a service scope, and each service scope may include at least one service or function. Service scopes corresponding to different role identifiers may overlap (in other words, two service scopes include a same service or function), or may not overlap. A plurality of different service scopes can be conveniently and clearly managed by using the role information.

The role information may be obtained by the user center, or may be directly input by an administrator. The administrator herein may be a management program having highest permission in an authorization system, and the management program may manage content and data of the authorization system.

An example in which the target application is a video playback application of a video playback website is used. A relationship between a role identifier and a service scope in the role information may be shown in Table 1.

TABLE 1

| Role identifier | Service scope |
| --- | --- |
| Temporary user | Information push service |
| Common user | Video playback service |
| Advanced user | Video playback service, advertisement time reduction service, and subscription service |
| Super user | Video playback service, advertisement removal service, and subscription service |

In Table 1, each row of information is one piece of role information, and three different pieces of role information have different service scopes. The different service scopes may include a same service, or may include no same service. For example, the service scope corresponding to the temporary user includes the information push service.

In some embodiments, step 408 may be performed at any moment before step 409.

Step 409: The second server determines a target service scope corresponding to a role identifier in permission information.

The permission information in the authorization credential sent by the terminal running the client to the second server running the target application may include at least one role identifier, and the target application may determine a target service scope corresponding to each of the at least one role identifier.

Step 410: The second server provides the terminal with a service in the target service scope.

Step 411: The second server adjusts the at least one piece of role information.

After providing the terminal with a service in the target service scope, the second server running the target application may adjust the at least one piece of locally stored role information. After adjusting the role information, the target application may upload adjusted role information to the user center, so that the user center writes an adjusted role identifier into the authorization credential in a subsequent authorization operation.

The adjustment of the at least one piece of role information may include at least one of role information addition, role information deletion, and role information modification. When the role information is modified, a role identifier and a service scope corresponding to the role identifier in the role information may be modified.

The target application may adjust the locally stored role information under control of the administrator. Alternatively, the target application may preset an interface, and the user center may adjust the role information in the target application by using the interface.

Step 412: Stop authorization.

When the authorization fails, the authorization may be stopped, and an authorization failure is notified to the target application and/or the client. The term "and/or" describes only an association relationship for describing associated objects and represents that three relationships may exist. For example, A and/or B may represent the following three cases: Only A exists, both A and B exist, and only B exists.

In at least one embodiment of the present disclosure, when a plurality of clients simultaneously access different applications, an application accessed by each client performs an authorization operation, and information used for authorization is not forwarded to the user center for authorization. Therefore, an authorization speed is high, and fewer communication resources are wasted. For example, the video playback platform includes 10 applications such as the user center, an application providing a series of playback functions, an application providing a movie playback function, and an application providing a variety show playback function. If each of the 10 applications is accessed by 100 clients in a short period of time, in other approaches, the 10 applications forward 1000 pieces of information used for authorization to the user center in a short period of time. In these other approaches, the user center performs authorization on the 1000 pieces of information used for authorization, and feeds back 1000 authorization results to the 10 applications. Therefore, both data transmission pressure of a channel between the application and the user center and authorization pressure of the user center are relatively high in these other approaches. Consequently, an authorization speed of these other approaches is greatly reduced in a period of time, and user experience of a user operating the client is seriously affected. However, according to the authorization method provided in at least one embodiment of the present disclosure, the 10 applications such as the application providing a series of playback functions, the application providing a movie playback function, and the application providing a variety show playback function may separately perform authorization on 100 clients. In addition, the information used for authorization of at least one embodiment does not need to be sent to the user center, and the user center does not need to feed back an authorization result to the client. Therefore, an authorization speed of at least one embodiment is greatly increased, user experience of a user operating the client is improved, and fewer communication resources are wasted compared with other approaches.

According to the authorization method provided in at least one embodiment of the present disclosure, each application locally performs, by using the client identifier, an authorization operation on an authorization credential issued by the user center to the client, and the user center does not perform centralized authorization. Compared with centralized authorization in other approaches, an authorization speed of at least one embodiment is increased through discrete authorization.

Figures 1, 5:
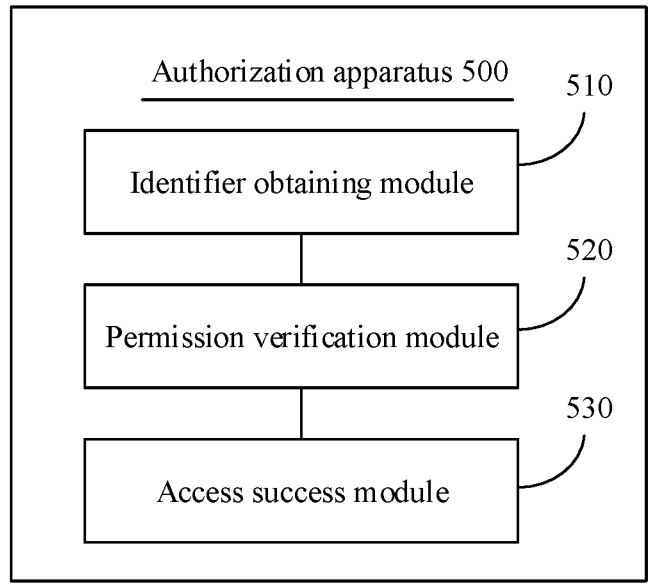
Figures 2, 5:
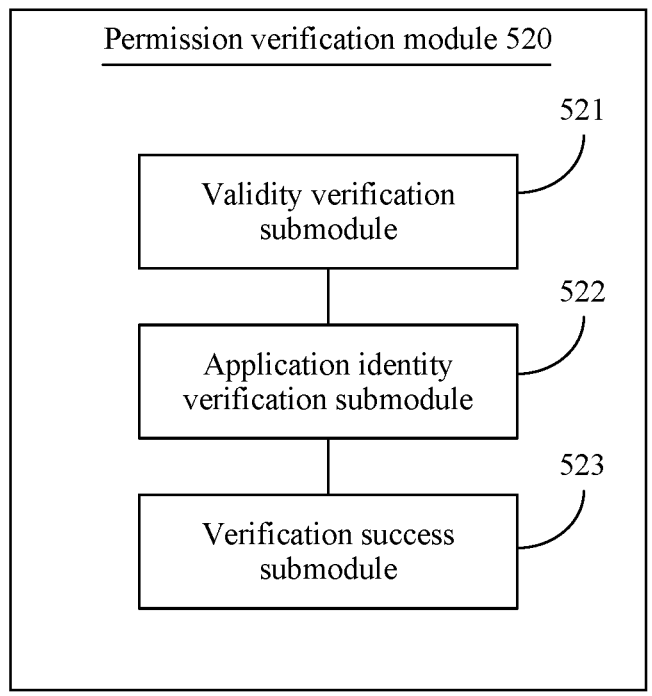
Figures 3, 5:
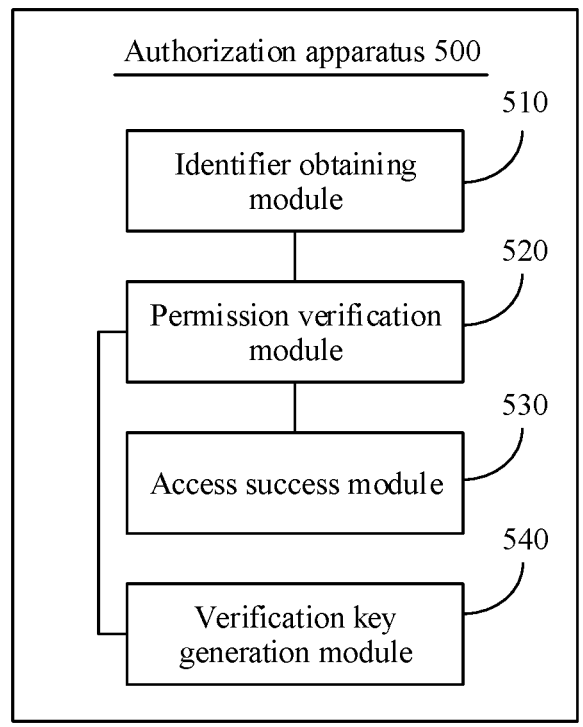
Figures 4, 5:
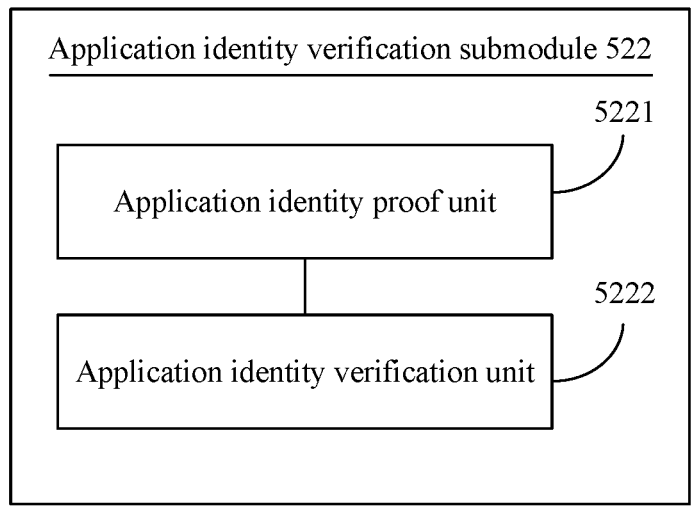
Figure 5:
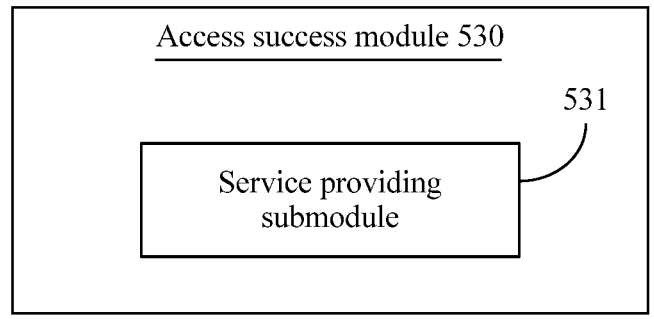

FIG. 5-1 is a structural block diagram of an authorization apparatus 500 according to an embodiment of the present disclosure. The authorization apparatus 500 may include:

an identifier obtaining module 510, configured to implement a function of step 304;

a permission verification module 520 configured to implement functions of step 401 to step 407; and an access success module 530 configured to implement functions of step 409 and step 410.

In some embodiments, as shown in FIG. 5-2, the permission verification module 520 includes:

a validity verification submodule 521 configured to implement a function of step 402;

an application identity verification submodule 522 configured to implement functions of step 404 to step 406; and a verification success submodule 523 configured to implement a function of step 407.

In some embodiments, as shown in FIG. 5-3, the authorization apparatus 500 of FIG. 5-1 further includes:

a verification key generation module 540 configured to implement a function of step 305.

As shown in FIG. 5-4, the application identity verification submodule 522 includes:

an application identity proof unit 5221 configured to implement a function of step 404; and an application identity verification unit 5222 configured to implement a function of step 405.

In some embodiments, as shown in FIG. 5-5, the access success module 530 includes:

a service providing submodule 531 configured to implement functions of step 409 and step 410.

Figures 5, 6:
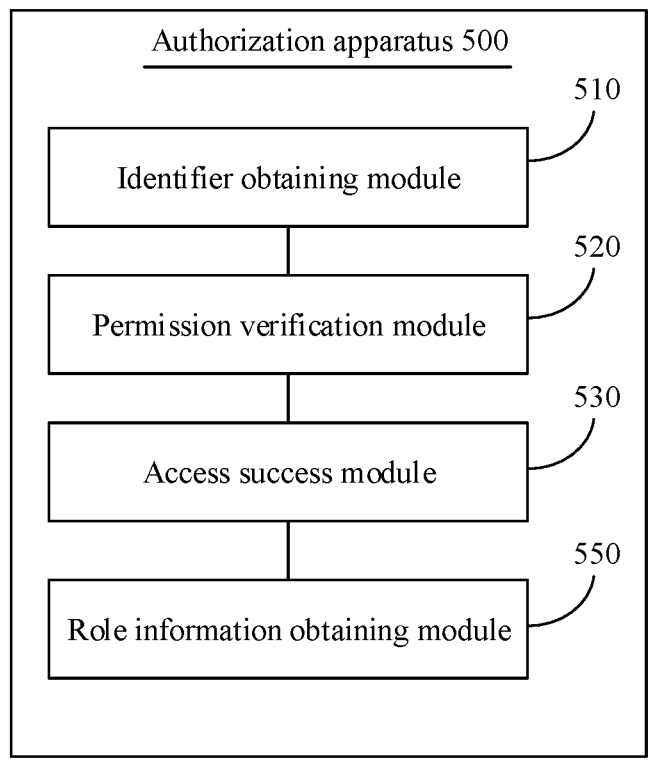

In some embodiments, as shown in FIG. 5-6, the authorization apparatus 500 of FIG. 5-1 further includes:

a role information obtaining module 550, configured to implement a function of step 408.

Figures 5, 6, 7:
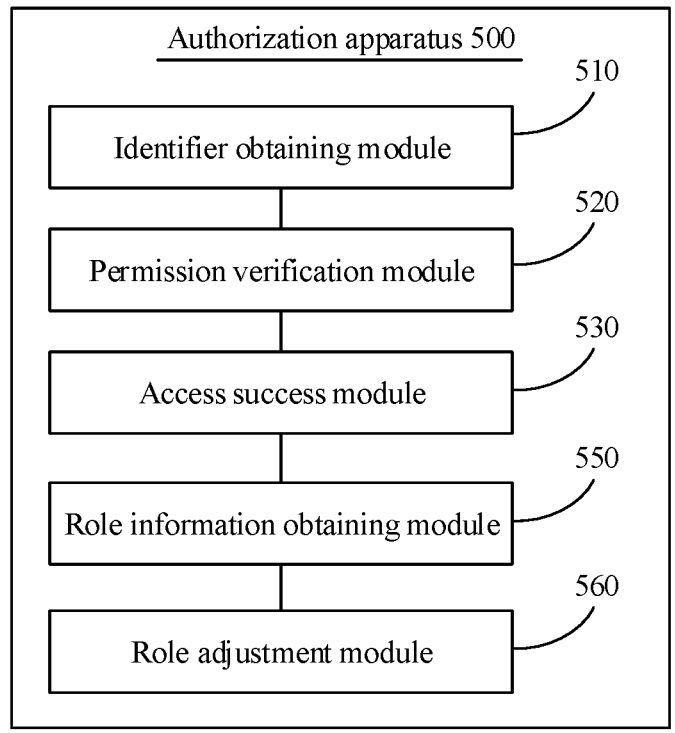
Figures 1, 6:
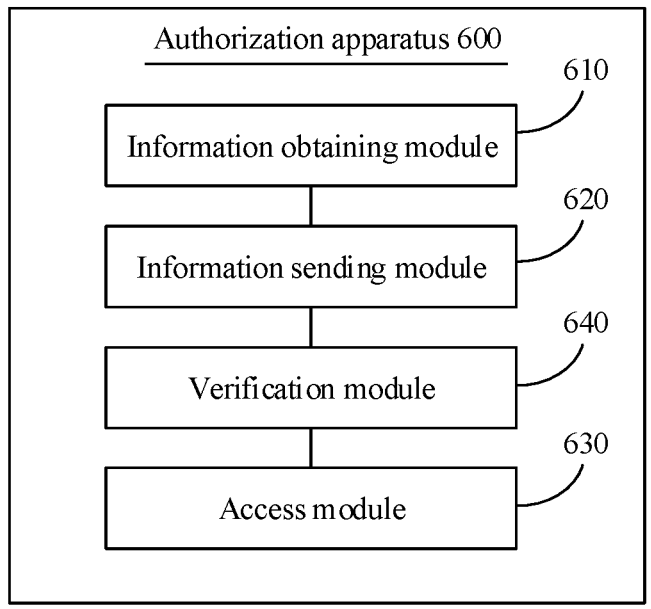
Figures 2, 6:
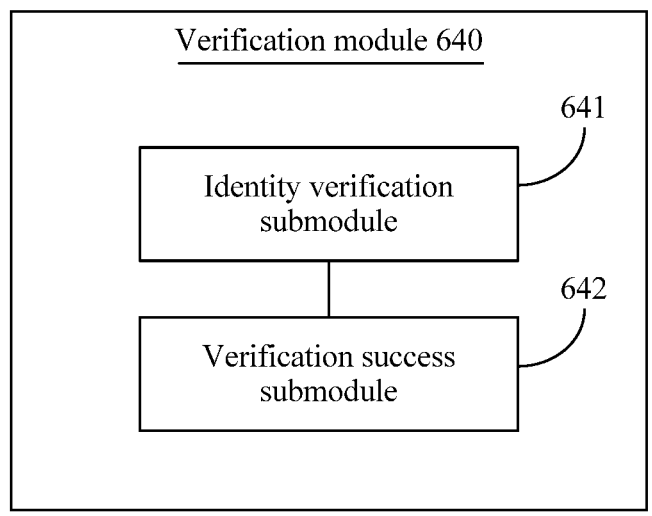
Figures 3, 6:
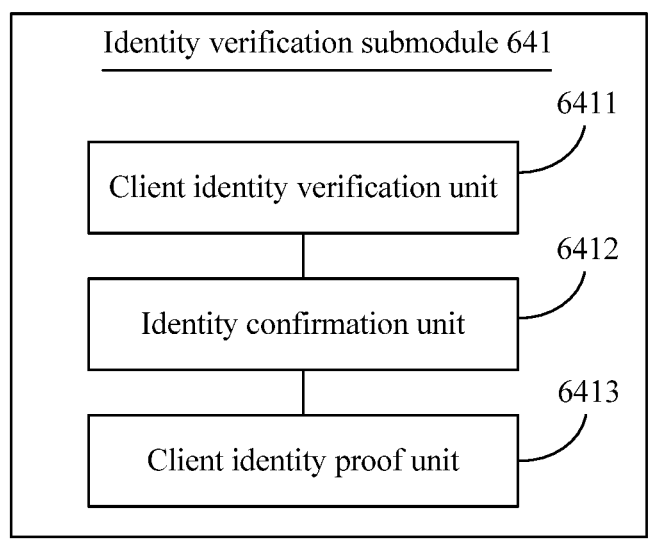
Figures 1, 7:
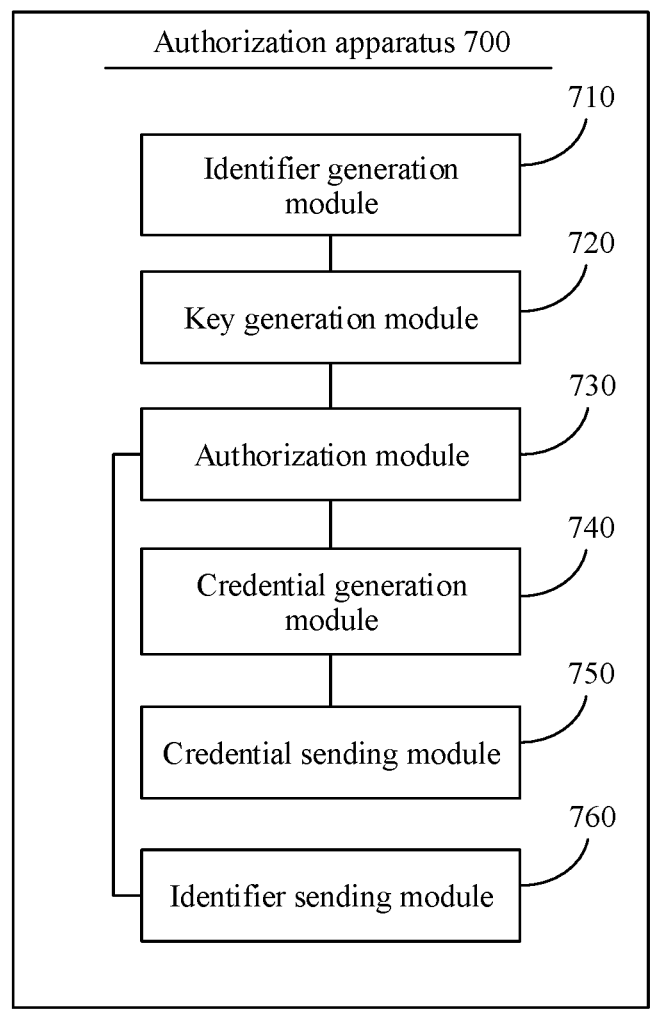
Figures 2, 7:
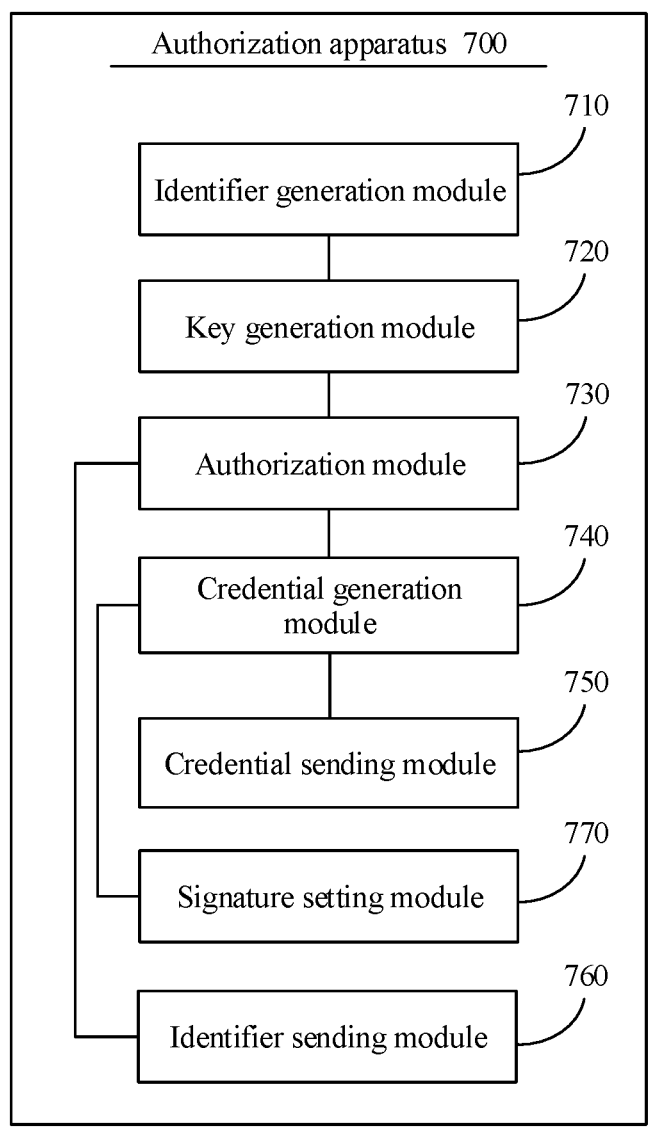

In some embodiments, as shown in FIG. 5-7, the authorization apparatus 500 of FIG. 5-6 further includes:

a role adjustment module 560 configured to implement a function of step 411.

In addition, the authorization apparatus 500 of FIG. 5-1, 5-6 or 5-7 may further include an application, and the application is configured to implement the authorization apparatus 500 serving as an application. For example, when the authorization apparatus 500 is a video playback application, the application is configured to implement a video playback.

According to the authorization apparatus provided in at least one embodiment of the present disclosure, each application locally performs, by using the client identifier, an authorization operation on an authorization credential issued by the user center to the client, and the user center does not perform centralized authorization. Compared with centralized authorization of other approaches, an authorization speed of at least one embodiment is increased through discrete authorization.

FIG. 6-1 is a structural block diagram of an authorization apparatus 600 according to an embodiment of the present disclosure. The authorization apparatus 600 may include:

an information obtaining module 610 configured to implement functions of step 301 and step 309;

an information sending module 620 configured to implement a function of step 401;

a verification module 640 configured to implement functions of step 402 to step 407; and an access module 630 configured to implement a function of step 410.

In some embodiments, as shown in FIG. 6-2, the verification module 640 includes:

an identity verification submodule 641 configured to implement functions of step 404 to step 406; and a verification success submodule 642 configured to implement a function of step 407.

In some embodiments, as shown in FIG. 6-3, the identity verification submodule 641 includes:

a client identity verification unit 6411 configured to implement a function of step 404;

an identity confirmation unit 6412 configured to implement a function of step 405; and a client identity proof unit 6413 configured to implement a function of step 406.

According to the authorization apparatus provided in at least one embodiment of the present disclosure, each application locally performs, by using the client identifier, an authorization operation on an authorization credential issued by the user center to the client, and the user center does not perform centralized authorization. Compared with centralized authorization of other approaches, an authorization speed of at least one embodiment is increased through discrete authorization.

FIG. 7-1 is a structural block diagram of an authorization apparatus 700 according to an embodiment of the present disclosure. The authorization apparatus 700 may include:

an identifier generation module 710 configured to implement a function of step 302;

a key generation module 720 configured to implement a function of step 306;

an authorization module 730 configured to implement a function of step 303;

a credential generation module 740 configured to implement a function of step 307;

a credential sending module 750 configured to implement a function of step 309; and an identifier sending module 760 configured to implement a function of step 304.

In some embodiments, as shown in FIG. 7-2, the authorization apparatus 700 of FIG. 7-1 further includes:

a signature setting module 770 configured to implement a function of step 308.

According to the authorization apparatus provided in at least one embodiment of the present disclosure, each application locally performs, by using the client identifier, an authorization operation on an authorization credential issued by the user center to the client, and the user center does not perform centralized authorization. Compared with centralized authorization in other approaches, an authorization speed of at least one embodiment is increased through discrete authorization.

Figure 8:
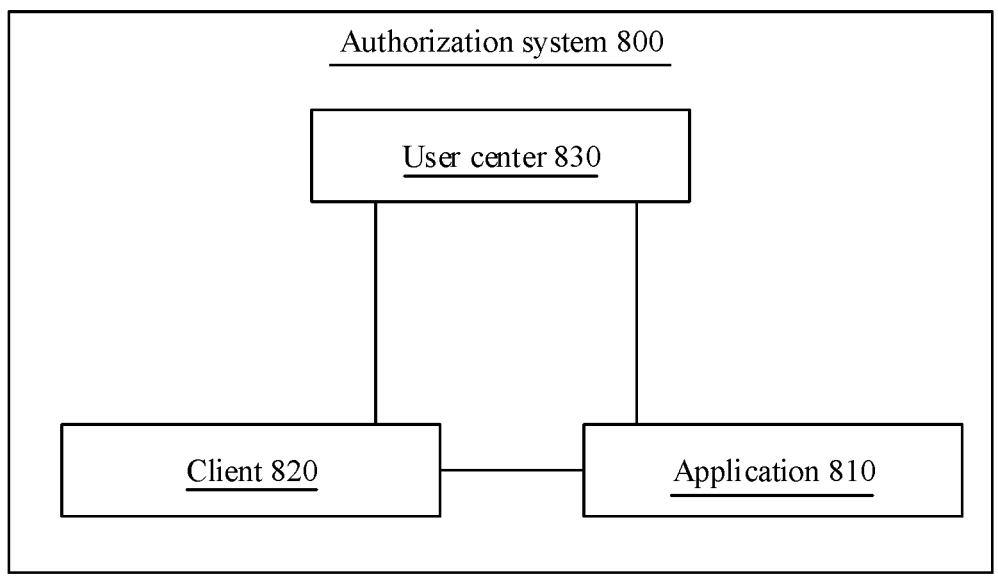
FIG. 8 is a block diagram of an authorization system according to at least one embodiment of the present disclosure.

FIG. 8 is a block diagram of an authorization system 800 according to an embodiment of the present disclosure. The authorization system 800 includes an application 810, a client 820, and a user center 830, and each of the application 810, the client 820, or the user center 830 are connected together.

In some embodiments, the application 810 includes the authorization apparatus provided in FIG. 5-1, FIG. 5-3, FIG. 5-6, or FIG. 5-7.

In some embodiments, the client 820 includes the authorization apparatus provided in FIG. 6-1.

In some embodiments, the user center 830 includes the authorization apparatus provided in FIG. 7-1 or FIG. 7-2.

At least an embodiment of this disclosure further provides a computer readable storage medium. In some embodiments, the computer readable storage medium of the present disclosure is part of memory 16 of authorization apparatus 10 of FIG. 2. The computer readable storage medium stores an instruction, and when the instruction runs on an authorization apparatus 10, the authorization apparatus 10 performs the authorization method provided in at least an embodiment. For example, the authorization method may include:

obtaining a client identifier of a client that is generated by a user center, where the client identifier is an identifier allocated by the user center after the client logs in to the user center;

performing, by using the client identifier, permission verification on an authorization credential when authorization information that includes the authorization credential and that is sent by the client is received, where the authorization credential is sent by the user center to the client, and is used together with the client identifier to prove a permission credential of the client; and allowing access of the client to an application when the permission verification on the authorization credential succeeds.

At least an embodiment of this disclosure further provides a computer readable storage medium. The computer readable storage medium stores an instruction, and when the instruction runs on an authorization apparatus 10, the authorization apparatus 10 performs the authorization method provided in at least an embodiment. For example, the authorization method may include:

obtaining authorization information that includes an authorization credential and that is generated by a user center, where the authorization credential includes a client identifier;

when a target application is to be accessed, sending authorization information that includes the authorization credential to the target application;

cooperating with the target application to perform permission verification on the authorization credential; and accessing the target application when the permission verification on the authorization credential succeeds.

At least an embodiment of this disclosure further provides a computer readable storage medium. The computer readable storage medium stores an instruction, and when the instruction runs on an authorization apparatus 10, the authorization apparatus 10 performs the authorization method provided in at least an embodiment. For example, the authorization method may include:

when a client logs in, generating a client identifier of the client;

generating a client key based on the client identifier by using a preset algorithm;

obtaining permission information of the client, where permission information records at least one application that can be accessed by the client;

generating an authorization credential of the client based on the client identifier and the permission information;

sending authorization information that includes the authorization credential to the client; and sending the client identifier to the at least one application, so that the at least one application performs permission verification on the authorization credential by using the client identifier.

It should be noted that, when the authorization apparatus 10 provided in at least of the embodiments performs authorization, division of the function modules is used as an example for the description. In some embodiments, the foregoing functions may be allocated to different function modules for implementation as required. In other words, an internal structure of a device is divided into different function modules to implement all or some of the foregoing functions. In some embodiments, the authorization apparatus provided in at least the foregoing embodiments has a same concept as an authorization method embodiment. For an implementation process of the method, refer to the apparatus embodiments, and the details are not described herein again for brevity.

A person of ordinary skill in the art may understand that all or some of the steps of the embodiments may be implemented by hardware or a program instructing related hardware. The program may be stored in a computer readable storage medium. The computer readable storage medium may include a read-only memory, a magnetic disk, an optical disc, or the like.

The foregoing descriptions are descriptions of some embodiments of the present disclosure, but are not intended to limit the scope of the present disclosure. One of ordinary skill in the art would understand that variations, modifications, equivalent replacements, improvements, or the like can be made without departing from the scope and spirit of the present disclosure, and would fall within the scope of the present disclosure.

What is claimed is:

1. An authorization method by an application stored in a memory, wherein the method comprises:

obtaining, by the application, a client identifier of a client that is generated by a user center;

performing, based on the client identifier, permission verification on an authorization credential, in response to authorization information being received by the application, the authorization information comprises the authorization credential, wherein the authorization credential is sent by the user center to the client; and allowing access of the client to the application in response to the permission verification on the authorization credential succeeding.

2. The method according to claim 1, wherein the performing of permission verification on the authorization credential comprises:

performing validity verification on the authorization credential in response to the authorization information being received by the application, wherein the validity verification is used to verify whether the authorization credential is generated by the user center;

performing, based on the client identifier, mutual identity verification with the client in response to the validity verification on the authorization credential succeeding; and in response to the mutual identity verification succeeding, determining that the permission verification succeeds.

3. The method according to claim 2, wherein the authorization credential comprises a digital signature generated based on a private key of the user center; and
  the performing of validity verification on the authorization credential in response to the authorization information being received by the application comprises:
    performing verification on the digital signature based on a public key of the user center; and
    in response to the verification succeeding, determining that the validity verification on the authorization credential succeeds, or
    in response to the verification failing, determining that the validity verification on the authorization credential fails.

4. The method according to claim 2, wherein after the obtaining the client identifier of the client that is generated by the user center, the method further comprises:
  generating a verification key based on the client identifier by using a preset algorithm; and
  the performing of mutual identity verification with the client comprises:
    proving, to the client by using a Challenge Handshake Authentication Protocol (CHAP), that the verification key is consistent with a client key of the client, wherein the client key is generated by the user center based on the client identifier by using the preset algorithm;
    verifying, by using the CHAP, whether the client key is consistent with the verification key; and
    in response to the client key being consistent with the verification key, determining that the mutual identity verification on the client succeeds.

5. The method according to claim 4, wherein the authorization information further comprises a first random character string; and
  the proving, to the client by using the CHAP comprises:
    generating a second random character string;
    generating a first hashed message authentication code (HMAC) by using a preset hash algorithm based on at least the verification key, the second random character string, the first random character string, or the client identifier; and
    sending the first HMAC and the second random character string to the client, and generating a second HMAC by using the preset hash algorithm based on at least the client key, the second random character string, the first random character string, or the client identifier, and in response to the second HMAC being consistent with the first HMAC, determining that the verification key is consistent with the client key.

6. The method according to claim 5, wherein the verifying, by using the CHAP comprises:
  receiving a third HMAC generated by the client by using the preset hash algorithm based at least on the client key, the second random character string, the first random character string, or an application name of a target application, wherein the application name of the target application is an application name of an application to be accessed by the client, and the client is configured to send the third HMAC to the target application in response to determining that the verification key is consistent with the client key;
  generating a fourth HMAC by using the preset hash algorithm based on at least the verification key, the second random character string, the first random character string, or the application name of the target application; and
  in response to the fourth HMAC being consistent with the third HMAC, determining that the client key is consistent with the verification key.

7. The method according to claim 2, wherein the authorization credential comprises validity period information that records a validity period of the authorization credential; and
  the performing of mutual identity verification with the client in response to the validity verification on the authorization credential succeeding comprises:
    in response to the validity verification on the authorization credential succeeding, determining, based on the validity period information, whether the authorization credential falls within the validity period; and
    in response to the authorization credential falling within the validity period, performing the mutual identity authentication with the client.

8. The method according to claim 1, wherein the authorization credential comprises permission information of the client, and the permission information records a service scope of the client; and
  the allowing of access of the client to the application in response to the permission verification on the authorization credential succeeding comprises:
    providing the client with a service in the service scope of the client in response to the permission verification on the authorization credential succeeding.

9. The method according to claim 8, wherein
  before the allowing of access of the client to the application in response to the permission verification on the authorization credential succeeding, the method further comprises:
    obtaining at least one piece of role information, wherein each of the at least one piece of role information comprises a role identifier and a service scope corresponding to the role identifier; and
  the permission information comprises at least one role identifier, and the providing the client with the service in the service scope of the client in response to the permission verification on the authorization credential succeeding comprises:
    in response to the permission verification on the authorization credential succeeding, determining a target service scope corresponding to the role identifier in the permission information; and
    providing the client with a service in the target service scope.

10. The method according to claim 9, wherein after the obtaining at least one piece of role information, the method further comprises:
  adjusting the at least one piece of role information, wherein the adjustment comprises at least one of role information addition, role information deletion, or role information modification.

11. An authorization method by a client, wherein the method comprises:
  obtaining authorization information generated by a user center, the authorization information comprises an authorization credential and a client key, wherein the authorization credential comprises a client identifier, and the client key is generated by the user center based on the client identifier by using a preset algorithm;

in response to a determination that a target application is to be accessed by the client, sending at least the authorization credential to the target application;

cooperating with the target application to perform permission verification on the authorization credential, the cooperating with the target application to perform permission verification on the authorization credential comprises: performing mutual identity verification with the target application in response to validity verification performed by the target application on the authorization credential succeeding, the performing of mutual identity verification with the target application comprises:

verifying, by using a Challenge Handshake Authentication Protocol (CHAP), whether the client key is consistent with a verification key, wherein the verification key is generated by the target application based on the client identifier by using the preset algorithm;

in response to the client key being consistent with the verification key, determining that the identity verification on the target application succeeds; and proving, to the target application by using the CHAP, that the client key is consistent with the verification key; and in response to the mutual identity verification succeeding, determining that the permission verification on the authorization credential succeeds; and accessing the target application in response to the permission verification on the authorization credential succeeding.

12. The method according to claim 11, wherein the authorization information further comprises a first random character string; and the verifying, by using the CHAP, whether the client key is consistent with the verification key comprises:

receiving a second random character string, and a first hashed message authentication code (HMAC) generated by the target application by using at least a preset hash algorithm based on the verification key, the second random character string, the first random character string, or the client identifier;

generating a second HMAC by using the preset hash algorithm based on at least the client key, the second random character string, the first random character string, or the client identifier; and in response to the first HMAC being consistent with the second HMAC, determining that the client key is consistent with the verification key.

13. The method according to claim 12, wherein the proving, to the target application by using the CHAP, that the client key is consistent with the verification key comprises:

in response to a determination that the client key is consistent with the verification key, generating a third HMAC by using the preset hash algorithm based on at least the client key, the second random character string, the first random character string, or an application name of the target application; and sending the third HMAC to the target application, so that the target application generates a fourth HMAC by using the preset hash algorithm based on at least the verification key, the second random character string, the first random character string, or the application name of the target application, and in response to the fourth HMAC being consistent with the third HMAC, and the target application determining that the client key is consistent with the verification key.

14. An authorization method by a user center, wherein the method comprises:

in response to a client logging in to a first server, generating, by the first server, a client identifier of the client;

generating a client key based on the client identifier by using a preset algorithm;

obtaining permission information of the client, wherein the permission information records at least one application that can be accessed by the client;

generating an authorization credential of the client based on the client identifier and the permission information;

sending authorization information that comprises the authorization credential to the client; and sending the client identifier to the at least one application, so that the at least one application performs permission verification on the authorization credential based on the client identifier.

15. The method according to claim 14, wherein before the sending of the authorization credential to the client, the method further comprises:

setting a digital signature on the authorization credential based on a private key in a local device; and the sending authorization information that comprises the authorization credential to the client comprises:

sending, to the client, the authorization credential on which the digital signature is set.

* * * * *